(12) United States Patent
Murakami (10) Patent No.: US 12,368,300 B2
(45) Date of Patent: Jul. 22, 2025

(54) SOLAR POWER GENERATION SYSTEM AND CONTROL METHOD

(71) Applicant: TOYOTA JIDOSHA KABUSHIKI KAISHA, Toyota (JP)

(72) Inventor: Yukinori Murakami, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 337 days.

(21) Appl. No.: 18/313,461

(22) Filed: May 8, 2023

(65) Prior Publication Data

US 2024/0039279 A1    Feb. 1, 2024

(30) Foreign Application Priority Data

Jul. 26, 2022    (JP) .................................. 2022-118378

(51) Int. Cl.
*H02J 3/00*    (2006.01)
*H02J 3/18*    (2006.01)
*H02J 7/00*    (2006.01)

(52) U.S. Cl.
CPC ............ *H02J 3/004* (2020.01); *H02J 3/1864* (2013.01); *H02J 7/0019* (2013.01); *H02J 2300/22* (2020.01)

(58) Field of Classification Search
CPC ........ H02J 3/004; H02J 3/1864; H02J 7/0019; H02J 2300/22
See application file for complete search history.

(56) References Cited

U.S. PATENT DOCUMENTS

| 2010/0198420 | A1* | 8/2010 | Rettger | H02S 10/00 |
| | | | | 706/46 |
| 2011/0276269 | A1* | 11/2011 | Hummel | G01W 1/10 |
| | | | | 702/3 |
| 2017/0104449 | A1* | 4/2017 | Drees | G01W 1/10 |
| 2019/0285672 | A1* | 9/2019 | Hoff | H02S 50/15 |

FOREIGN PATENT DOCUMENTS

| JP | 2008182017 A | 8/2008 |
| JP | 2016152742 A | 8/2016 |
| JP | 2020198729 A | 12/2020 |

* cited by examiner

*Primary Examiner* — Mayla Gonzalez Ramos
(74) *Attorney, Agent, or Firm* — Dickinson Wright, PLLC (57) ABSTRACT

A solar power generation system includes a solar power generation device, a load device, and a control device. The control device includes a switching control unit for executing switching control for starting power supply to the load device when electric energy generated by the solar power generation device is equal to or larger than a starting threshold value and stopping the power supply to the load device when the electric energy becomes equal to or smaller than a stopping threshold value, a number-of-times acquiring unit for acquiring the number of times of execution of the switching control, and a threshold setting unit for increasing or reducing at least one of the staring threshold value and the stopping threshold value based on whether the number of times of execution acquired by the number-of-times acquiring unit within a first predetermined period has reached a predetermined first upper limit number of times.

6 Claims, 7 Drawing Sheets

SOLAR POWER GENERATION SYSTEM AND CONTROL METHOD

CROSS-REFERENCE TO RELATED APPLICATION

This application claims priority to Japanese Patent Application No. 2022-118378 filed on Jul. 26, 2022 incorporated herein by reference in its entirety.

BACKGROUND

1. Technical Field

The present disclosure relates to a solar power generation system and a control method.

2. Description of Related Art

Japanese Unexamined Patent Application Publication No. 2020-198729 (JP 2020-198729 A) discloses a system in which when power generated by a solar power generation device is larger than power consumed by a load device, the load device is operated by the generated power, and surplus power is stored in a storage battery, and when the generated power is smaller than the power consumed by the load device, the load device is operated by the generated power and power discharged from the storage battery. The system described in JP 2020-198729 A predicts a power generation amount for a predetermined period from generated power during sunny time or a relationship between global solar radiation on a horizontal surface and time, and determines operation start and operation stop of the load device based on a prediction result.

SUMMARY

In general, in a solar power generation system, when electric energy generated by a solar panel (solar power generation device) becomes equal to or larger than a predetermined starting threshold value, power supply to a load device is started, and when the electric energy generated by the solar panel becomes equal to or smaller than a predetermined stopping threshold value, the power supply to the load device is stopped. Such a series of switching operations for starting and stopping the power supply imposes a burden on the entire system, such as a solder joint of a control device, a relay circuit, and an electronic circuit.

In order to reduce the number of times of the switching operations, it is conceivable to increase the hysteresis width of control (a difference between the starting threshold value and the stopping threshold value). However, when the hysteresis width of the control is increased, there is an issue that a power supply opportunity for the load device is reduced, and power supply efficiency is deteriorated. On the other hand, when the hysteresis width of the control is reduced, there is an issue that the lifetime of the entire system is reduced due to an increase in the execution frequency of the switching operations.

The present disclosure has been made to solve the above issues. That is, one of the objects of the present disclosure is to provide a technique capable of effectively suppressing a reduction in the lifetime of the entire system while improving the power supply efficiency to the load device.

A system of the present disclosure is a solar power generation system (1) including:
a solar power generation device (10);
a load device (40) to which power generated by the solar power generation device (10) is supplied; and
a control device (100) that controls power supply of the power from the solar power generation device (10) to the load device (40).
The control device (100) is characterized by including
a switching control unit (110) that executes switching control for starting the power supply to the load device (40) when electric energy (W) generated by the solar power generation device (10) becomes equal to or larger than a predetermined starting threshold value (WU), and stopping the power supply to the load device (40) when the electric energy (W) becomes equal to or smaller than a predetermined stopping threshold value (WB) that is smaller than the starting threshold value (WU),
a number-of-times acquiring unit (120) that acquires the number of times of execution (Nc) of starting or stopping of the power supply by the switching control, and
a threshold value setting unit (130) that increases or reduces at least one of the starting threshold value (WU) and the stopping threshold value (WB) based on whether the number of times of execution (Nc) acquired by the number-of-times acquiring unit (120) within a first predetermined period (T1) has reached a predetermined first upper limit number of times (Nm1) determined as an upper limit number of times of execution of the switching control within the first predetermined period (T1).

A method according to the present disclosure is a control method of a solar power generation system (1) that supplies power generated by a solar power generation device (10) to a load device (40), and is characterized by
executing switching control for starting power supply to the load device (40) when electric energy (W) generated by the solar power generation device (10) becomes equal to or larger than a predetermined starting threshold value (WU), and stopping the power supply to the load device (40) when the electric energy (W) becomes equal to or smaller than a predetermined stopping threshold value (WB) that is smaller than the starting threshold value (WU),
acquiring the number of times of execution (Nc) of starting or stopping of the power supply by the switching control, and
increasing or reducing at least one of the starting threshold value (WU) and the stopping threshold value (WB) based on whether the number of times of execution (Nc) acquired within a first predetermined period (T1) has reached a predetermined first upper limit number of times (Nm1) determined as an upper limit number of times of execution of the switching control within the first predetermined period (T1).

A storage medium according to the present disclosure stores a program, and the program is characterized by causing a computer of a solar power generation system (1) that supplies power generated by a solar power generation device (10) to a load device (40) to perform functions including:
executing switching control for starting power supply to the load device (40) when electric energy (W) generated by the solar power generation device (10) becomes equal to or larger than a predetermined starting threshold value (WU), and stopping the power supply to the load device (40) when the electric energy (W) becomes equal to or smaller than a predetermined stopping threshold value (WB) that is smaller than the starting threshold value (WU);

acquiring the number of times of execution (Nc) of starting or stopping of the power supply by the switching control; and increasing or reducing at least one of the starting threshold value (WU) and the stopping threshold value (WB) based on whether the number of times of execution (Nc) acquired within a first predetermined period (T1) has reached a predetermined first upper limit number of times (Nm1) determined as an upper limit number of times of execution of the switching control within the first predetermined period (T1).

According to the above configuration, the threshold value setting unit (130) increases or reduces at least one of the starting threshold value (WU) and the stopping threshold value (WB) based on whether the number of times of execution (Nc) of the switching control has reached the first upper limit number of times (Nm1). Thus, for example, when the number of times of execution (Nc) has reached the first upper limit number of times (Nm1), the hysteresis width of the control that is a difference between the starting threshold value (WU) and the stopping threshold value (WB) can be increased, and the execution frequency of the switching control can be suppressed. By suppressing the execution frequency of the switching control, it is possible to effectively suppress a reduction in the lifetime of the entire system. When the number of times of execution (Nc) has not reached the first upper limit number of times (Nm1), the hysteresis width of the control can be reduced, and the execution frequency of the switching control can be increased. By increasing the execution frequency of the switching control, it is possible to improve the power supply efficiency to the load device (40).

In the above description, for the purpose of easy understanding of the disclosure, reference signs that are used in an embodiment are added in parentheses to the configuration requirements of the disclosure corresponding to the embodiment. However, each configuration requirement is not limited to the embodiment specified by the reference signs.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, a solar power generation system, a control method, and a program according to the present embodiment will be described with reference to the drawings.

Hardware Configuration

Figure 1:
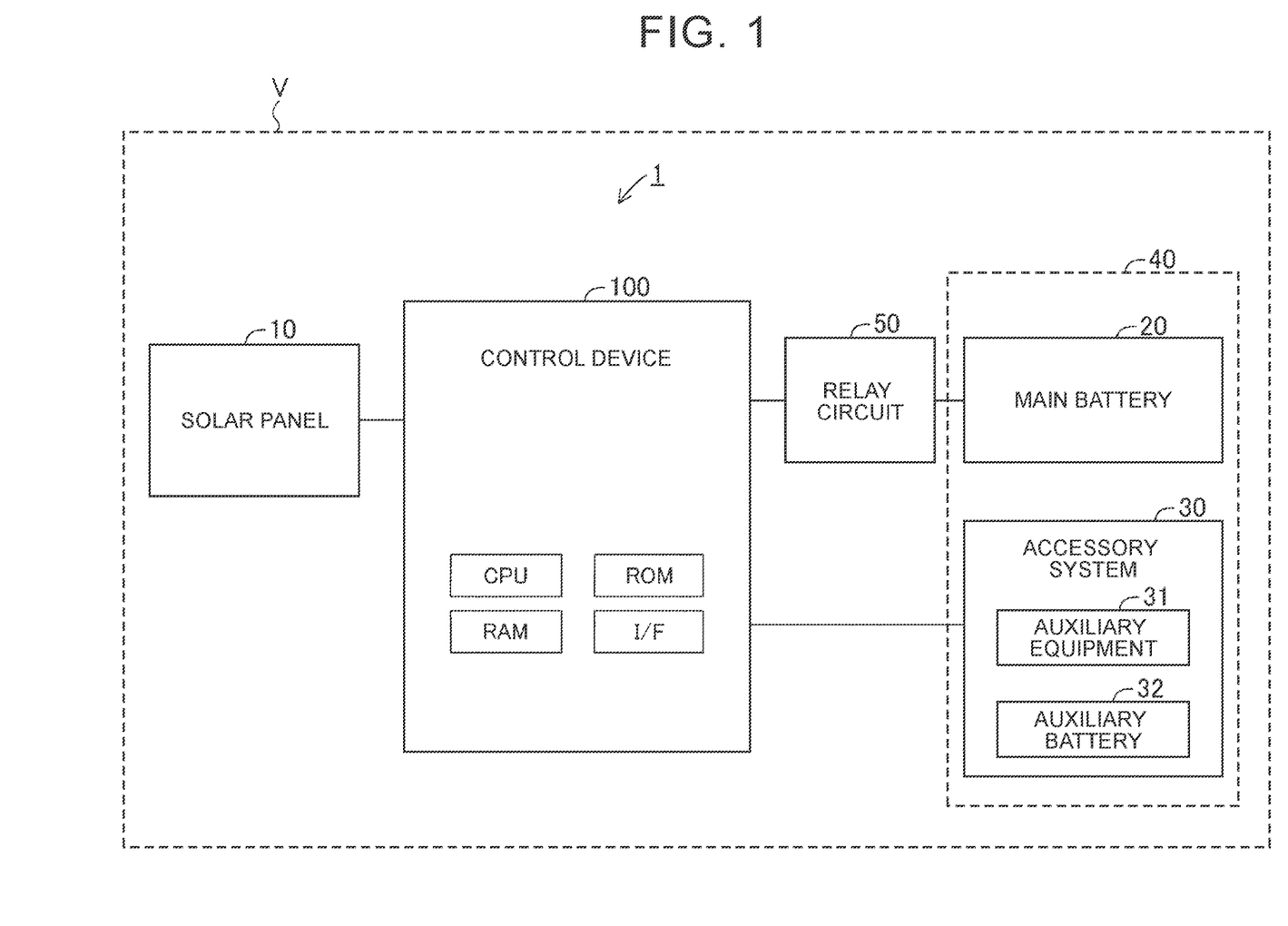
FIG. 1 is a schematic diagram showing a hardware configuration of a solar power generation system according to the present embodiment.

FIG. 1 is a schematic diagram illustrating a hardware configuration of a solar power generation system 1 according to the present embodiment. The solar power generation system 1 is mounted on a vehicle V, and includes a solar panel 10, a load device 40, a relay circuit 50, and a control device 100.

The solar panel 10 is a solar power generation device that generates electricity by receiving sunlight. Electric power generated by the solar panel 10 (hereinafter, generated electric power) is supplied to the control device 100. The electric energy generated by the solar panel 10 depends on the amount of sunlight. The solar panel 10 may be provided on, for example, a roof of the vehicle V.

The load device 40 includes a main battery 20 and an auxiliary system 30. Power generated by the solar panel 10 is supplied to the load device 40 via the control device 100.

The main battery 20 is, for example, a secondary battery such as a lithium ion battery. The main battery 20 is a battery for supplying electric power to a driving device (not shown) used for driving the vehicle V, such as a traveling motor mounted on the vehicle V. The main battery 20 can store the generated electric power supplied from the solar panel 10 via the control device 100 and the relay circuit 50.

The auxiliary system 30 includes, for example, an auxiliary device 31 other than a drive system device such as an air conditioner or a lighting device, and an auxiliary battery 32 for supplying power to the auxiliary devices 31. The auxiliary device 31 is operated by generated electric power supplied from the solar panel 10 via the control device 100 or electric power supplied from the auxiliary battery 32. The auxiliary battery 32 is, for example, a lead-acid battery having a 12V rated voltage, and can store generated electric power supplied from the solar panel 10 via the control device 100.

The relay circuit 50 is provided between the control device 100 and the main battery 20. The relay circuit 50 is configured to be switchable between a power supply starting state (ON) in which the supply of the generated power from the solar panel 10 to the main battery 20 is started and a power supply stopping state (OFF) in which the supply of the generated power from the solar panel 10 to the main battery 20 is stopped in response to a command from the control device 100.

The control device 100 is a so-called Electronic Control Unit (ECU) including, for example, Central Processing Unit (CPU), Read Only Memory (ROM), Random Access Memory (RAM), an interface device, and the like. CPU executes various programs stored in ROM. ROM is an example of a storage medium. ROM is a non-volatile memory that stores data and the like required for CPU to execute various programs. RAM provides a working area to be deployed when various programs are executed by CPU. The interface device is a communication device for communicating with an external device. The control device 100 electrically connects the solar panel 10, the relay circuit 50, and the auxiliary system 30, and supplies the power generated by the solar panel 10 to the main battery 20 and the auxiliary system 30.

In FIG. 1, the relay circuit 50 is shown only on the main battery 20 side, but a relay circuit (not shown) is also provided on the auxiliary system 30 side. Therefore, in the following description, the relay circuits included in the main battery 20 and the auxiliary system 30 are collectively referred to as "relay circuits". In the following description, the main battery 20 and the auxiliary system 30 are collectively referred to as a "load device 40".

Software Configuration

Figure 2:
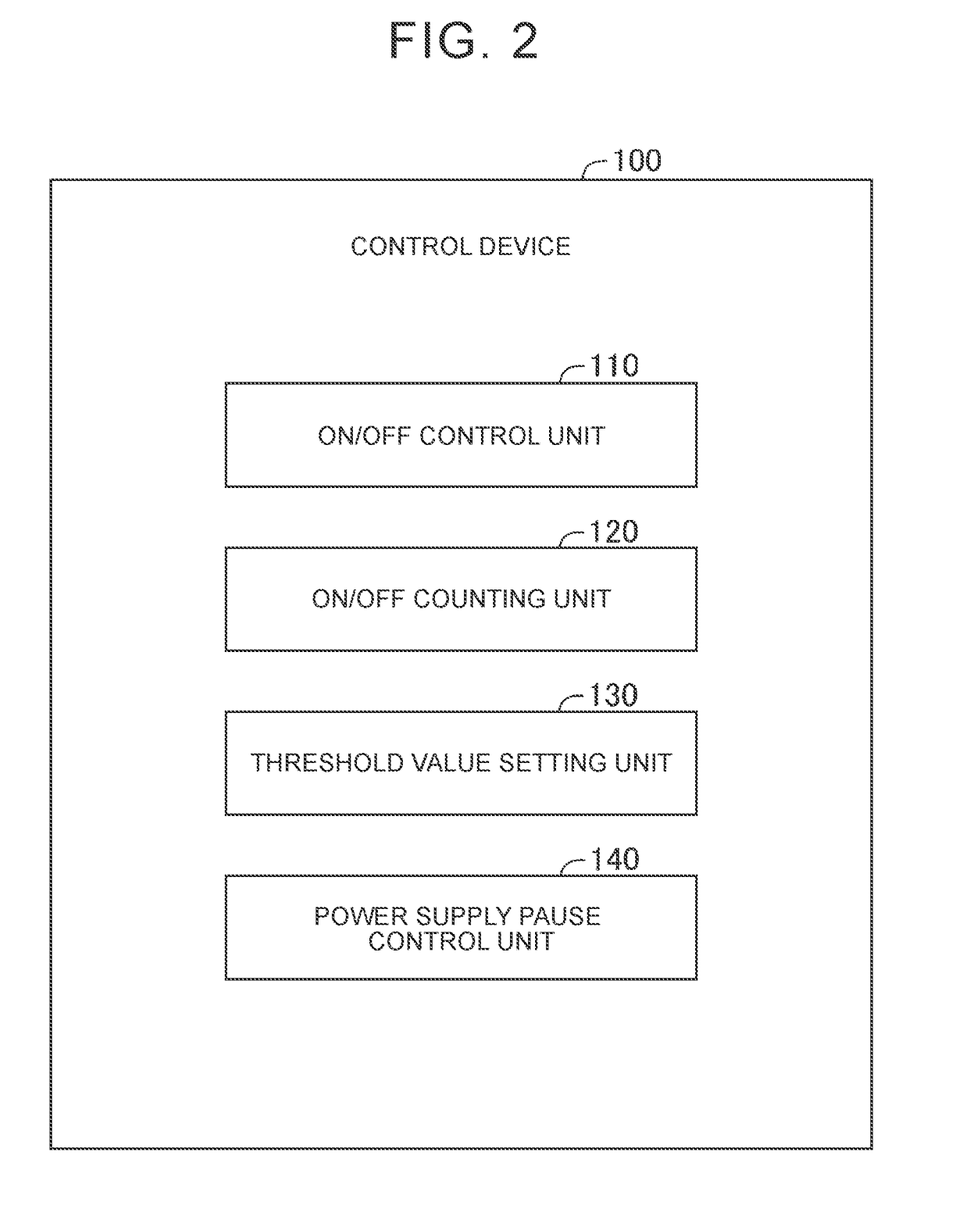
FIG. 2 is a schematic diagram illustrating a software configuration of the control device according to the present embodiment.

FIG. 2 is a schematic diagram illustrating a software configuration of the control device 100 according to the present embodiment.

As illustrated in FIG. 2, the control device 100 includes an ON/OFF control unit 110, an ON/OFF counting unit 120, a threshold value setting unit 130, a power supply pause control unit 140, and the like as functional elements. These functional elements 110 to 140 are realized by CPU of the control device 100 reading a program stored in ROM into a RAM and executing the program. Note that although each of the functional elements 110 to 140 is described as being included in the control device 100 which is integrated hardware in the present embodiment, any one of them may be provided in another control device separate from the control device 100.

ON/OFF control unit 110 is an exemplary switching control unit of the present disclosure, and acquires the generated electric energy W of the solar panel 10. Further, ON/OFF control unit 110 executes ON/OFF control for switching between a power supply start (ON) for starting supply of the generated power from the solar panel 10 to the load device 40 and a power supply stop (OFF) for stopping the supply of the generated power from the solar panel 10 to the load device 40.

Specifically, ON/OFF control unit 110 controls the relay circuit to be turned ON when the generated electric energy W of the solar panel 10 becomes equal to or larger than a predetermined power supply starting threshold value WU. When the relay circuit is turned ON, power supply to the load device 40 is started. On the other hand, ON/OFF control unit 110 controls the relay circuit to be turned OFF when the generated electric energy W of the solar panel 10 becomes equal to or less than the predetermined power supply stopping threshold value WB during the power supply to the load device 40. When the relay circuit is turned OFF, the power supply to the load device 40 is stopped. Here, the power supply stopping threshold value WB is smaller than the power supply starting threshold value WU (W<WU). For example, the power supply stopping threshold value WB is preferably set to be equal to or slightly larger than the power consumption amount based on the power consumption amount required to maintain the operation of the control device 100 or the like.

ON/OFF counting unit 120 is an example of the number-of-times acquiring unit of the present disclosure, the power generation from the solar panel 10 to the load device 40 is supplied, i.e., counts the number of times of execution Nc of ON/OFF control by ON/OFF control unit 110. Here, the number of times of execution Nc of ON/OFF control is counted as one, for example, a series of operations from ON to OFF of the relay circuit. That is, ON/OFF counting unit 120 counts either the number of times in which ON/OFF control unit 110 turns ON the relay circuit or the number of times in which the relay circuit turns OFF the relay circuit as the number of times of execution Nc. The counting unit 120 stores the counted number of times of execution Nc in a storage unit (for example, a RAM) of the control device 100 in association with the date and time data. The date and time information may be acquired from, for example, a clock function included in the control device 100 or another in-vehicle device (for example, a navigation device or the like).

The threshold value setting unit 130 executes a threshold setting process of increasing or decreasing the power supply starting threshold value WU based on the number of times of execution Nc of ON/OFF control counted by ON/OFF counting unit 120. Specifically, a reference starting threshold value $WU_0$ as an initial value (default value) is stored in advance in the storage unit of the control device 100. The reference starting threshold value $WU_0$ is greater than the power supply stopping threshold value WB. In addition, the storage unit of the control device 100 stores a first upper limit number of times Nm1 that determines the upper limit number of times of executing ON/OFF control in the first predetermined period T1 (for example, one day). The first upper limit number of times Nm1 is set based on, for example, the number of times that the entire lifetime of the control device 100 and the relay circuit can be effectively prevented from decreasing. The first upper limit number of times Nm1 may be a fixed value, or may be a variable value that decreases with an increase in the number of cumulative executions of aging and ON/OFF control.

The threshold value setting unit 130 sets a value obtained by subtracting the predetermined first correction value W1 from the reference starting threshold value $WU_0$ to the power supply starting threshold value WU ($=WU_0-W1$) when the number of times of execution Nc of executing ON/OFF control in the first predetermined period T1 is equal to or less than the first upper limit number of times Nm1. The first correction value W1 may be either a fixed value or a variable value. When the first correction value W1 is set to a variable value, the first correction value W1 may be set to have a larger value as the difference (absolute value) between the first upper limit number of times Nm1 and the number of times of execution Nc increases.

As described above, when the number of times of execution Nc of ON/OFF control is equal to or less than the first upper limit number of times Nm1, the hysteresis–width (=WU−WB) of ON/OFF control is narrowed when the power supply starting threshold value WU is decreased from the reference starting threshold value $WU_0$. When the power supply starting threshold value WU is decreased, it is possible to increase the possibility that the generated electric energy W of the solar panel 10 reaches the power supply starting threshold value WU. In other words, ON/OFF control unit 110 can increase the frequency of turning ON the relay circuit, and can increase the duration of keeping the relay circuit in ON. As a result, the power supply opportunity for the load device 40 can be effectively secured, and the power supply efficiency can be improved.

The threshold value setting unit 130 sets a value obtained by adding the predetermined second correction value W2 to the reference starting threshold value $WU_0$ to the power supply starting threshold value WU ($=WU_0+W2$) when the number of times of execution Nc of ON/OFF control in the first predetermined period T1 exceeds the first upper limit number of times Nm1. The second correction value W2 may be either a fixed value or a variable value. When the second correction value W2 is set to a variable value, the second correction value W2 may be set to have a larger value as the difference (absolute value) between the first upper limit number of times Nm1 and the number of times of execution Nc increases.

As described above, the hysteresis-width ($=WU-WB$) of ON/OFF control is widened when the number of times of execution Nc of ON/OFF control exceeds the first upper limit number of times Nm1 and the power supply starting threshold value WU is increased from the reference threshold value $WU_0$. Increasing the power supply starting threshold value WU can reduce the possibility that the generated electric energy W of the solar panel 10 reaches the power supply starting threshold value WU. That is, it is possible to reliably reduce the frequency at which ON/OFF control unit 110 switches the relay circuit from OFF to ON. As a result, the burden on the control device 100 and the relay circuit and the like associated with the repetition of ON/OFF control can be reduced, and the life of the entire system can be effectively prevented from being deteriorated.

Figure 3A:
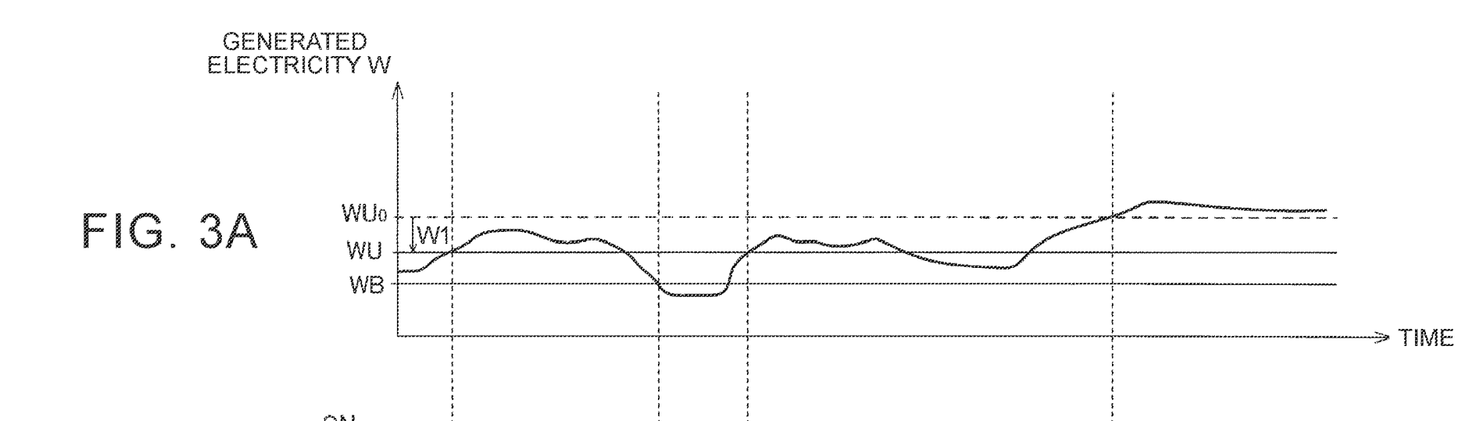
FIG. 3A is a timing chart illustrating the effectiveness of decreasing the power supply starting threshold value when the number of executions of ON/OFF control is less than or equal to the first upper limit number.
Figure 3B:
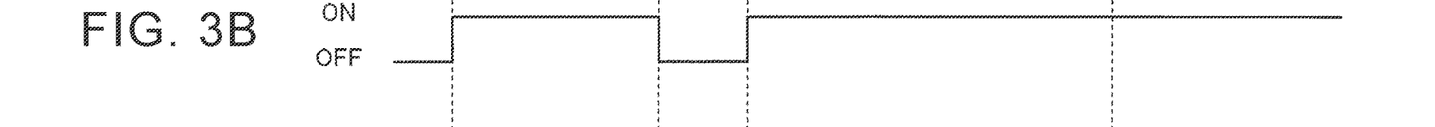
FIG. 3B is a timing chart illustrating the effectiveness of decreasing the power supply starting threshold value when the number of executions of ON/OFF control is less than or equal to the first upper limit number.
Figure 3C:
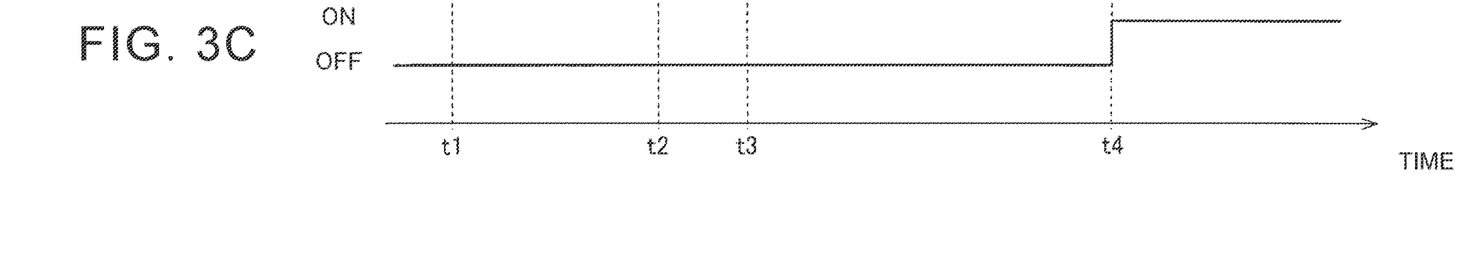
FIG. 3C is a timing chart illustrating the effectiveness of decreasing the power supply starting threshold value when the number of executions of ON/OFF control is less than or equal to the first upper limit number.

FIGS. 3A, 3B, and 3C are timing charts for explaining the effectiveness of reducing the power supply starting threshold value WU when the number of times of execution Nc of ON/OFF control is equal to or less than the first upper limit number of times Nm1. FIG. 3A shows the generated electric energy W of the solar panel 10 that varies according to the amount of sunlight. FIG. 3B shows ON/OFF of the relay circuit according to the present embodiment for reducing the power supply starting threshold value WU. FIG. 3C shows ON/OFF of a comparative relay circuit in which the power supply starting threshold value WU is not reduced, i.e., the power supply starting threshold value WU is maintained at the reference starting threshold value $WU_0$.

As shown in FIGS. 3A, 3B, and 3C, when the generated electric energy W reaches the power supply starting threshold value WU at the time t1, in the present embodiment shown in FIG. 3B, the power supply to the load device 40 is started by switching the relay circuit from OFF to ON. On the other hand, in the comparative example shown in FIG. 3C, since the generated electric energy W does not reach the reference starting threshold value $WU_0$, power is not supplied to the load device 40.

When the generated electric energy W decreases to the power supply stopping threshold value WB at the time t2, in the present embodiment shown in FIG. 3B, the relay circuit is switched from ON to OFF, and the power supply to the load device 40 is stopped. Thereafter, when the generated electric energy W reaches the power supply starting threshold value WU at the time t3, in the present embodiment shown in FIG. 3B, the power supply to the load device 40 is resumed by switching the relay circuit from OFF to ON. On the other hand, in the comparative example shown in FIG. 3C, since the generated electric energy W does not reach the reference starting threshold value $WU_0$, the power supply to the load device 40 is still not performed. When the generated electric energy W reaches the reference starting threshold value $WU_0$ at the time t4, the comparative example shown in FIG. 3C also starts power supply to the load device 40.

That is, in the present embodiment shown in FIG. 3B, by narrowing the hysteresis-width of ON/OFF control, it is possible to effectively increase the number of times the relay circuit is switched from OFF to ON than in the comparative embodiment shown in FIG. 3C. As a result, for example, even when the generated electric energy W of the solar panel 10 is changed to a value lower than the reference starting threshold value $WU_0$, the power supply opportunity for the load device 40 can be effectively secured.

Figure 4A:
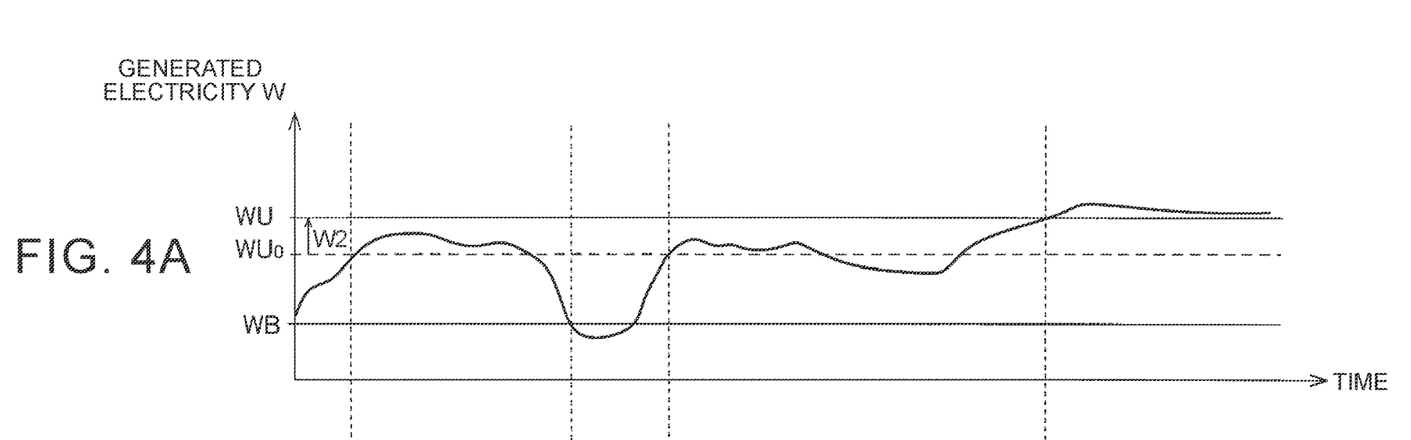
FIG. 4A is a timing chart illustrating the effectiveness of increasing the power supply starting threshold value when the number of executions of ON/OFF control reaches the first upper limit number.
Figure 4B:
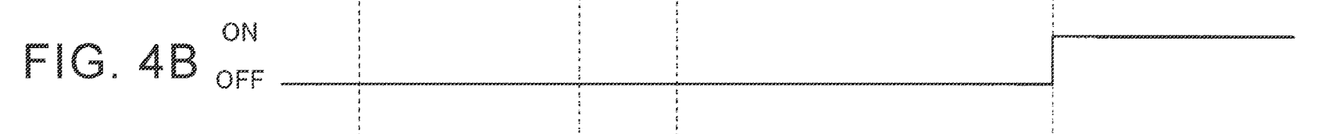
FIG. 4B is a timing chart illustrating the effectiveness of increasing the power supply starting threshold value when the number of executions of ON/OFF control reaches the first upper limit number.
Figure 4C:
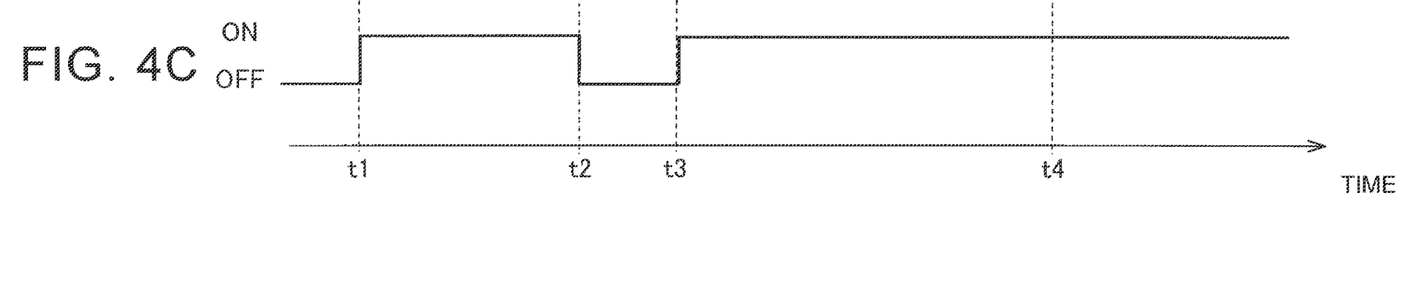
FIG. 4C is a timing chart illustrating the effectiveness of increasing the power supply starting threshold value when the number of executions of ON/OFF control reaches the first upper limit number.

FIGS. 4A, 4B, and 4C are timing charts for explaining the effectiveness of increasing the power supply starting threshold value WU when the number of times of execution Nc of ON/OFF control reaches the first upper limit number of times Nm1. FIG. 4A shows the generated electric energy W of the solar panel 10 that varies in accordance with the amount of sunlight. FIG. 4B shows ON/OFF of the relay circuit of the present embodiment for increasing the power supply starting threshold value WU. FIG. 4C shows an ON/OFF of a comparative relay circuit in which the power supply starting threshold value WU is not increased, that is, the power supply starting threshold value WU is maintained at the reference threshold value $WU_0$.

As shown in FIGS. 4A, 4B, and 4C, when the generated electric energy W reaches the reference starting threshold value $WU_0$ at the time t1, in the comparative example shown in FIG. 4C, the power supply to the load device 40 is started by switching the relay circuit from OFF to ON. On the other hand, in the present embodiment shown in FIG. 4B, since the generated electric energy W does not reach the power supply starting threshold value WU, the relay circuit is maintained in OFF.

When the generated electric energy W drops to the power supply stopping threshold value WB at the time t2, in the comparative example shown in FIG. 4C, the relay circuit is switched from ON to OFF, and the power supply to the load device 40 is stopped. Thereafter, when the generated electric energy W reaches the reference starting threshold value $WU_0$ at the time t3, in the comparative example shown in FIG. 4C, the power supply to the load device 40 is resumed by switching the relay circuit from OFF to ON. On the other hand, in the present embodiment shown in FIG. 4B, since the generated electric energy W does not reach the power supply starting threshold value WU, the relay circuit is still maintained in OFF. When the generated electric energy W reaches the power supply starting threshold value WU at the time t4, the power supply to the load device 40 is started by switching the relay circuit from OFF to ON also in the present embodiment shown in FIG. 4B.

That is, in the present embodiment shown in FIG. 4B, by widening the hysteresis range of ON/OFF control, it is possible to effectively reduce the frequency at which the relay circuit is switched from OFF to ON than in the comparative embodiment shown in FIG. 4C. As a result, the burden on the control device 100, the relay circuit, and the like can be reliably reduced, and a reduction in the life of the entire system can be effectively prevented.

Although the threshold value setting unit 130 has been described as increasing or decreasing the power supply starting threshold value WU as the threshold setting process, the power supply stopping threshold value WB or both the power supply starting threshold value WU and the power supply stopping threshold value WB may be increased or decreased. In this case, it is desirable to increase or decrease the power supply stopping threshold value WB, for example, considering the power consumed by the control device 100 and the load device 40 at that time.

Referring again to FIG. 2, when any one of the following pause conditions is satisfied, the power supply pause control unit 140 executes power supply pause control for pausing (prohibiting) power supply to the load device 40 for a predetermined time.

(1) First pause condition: When the number of times of execution Nc of ON/OFF control reaches a predetermined second upper limit number Nm2 within the second predetermined period T2.

(2) Second pause condition: When ON/OFF control unit 110 switches the relay circuit from ON to OFF.

When the first pause condition is satisfied, the power supply pause control unit 140 pauses the power supply to the load device 40 immediately after the number of times of execution Nc of ON/OFF control reaches the second upper limit number Nm2 until a predetermined first time H1 elapses. That is, even if the generated electric energy W reaches the power supply starting threshold value WU until the first time H1 elapses, the relay circuit is maintained in OFF. The second predetermined period T2 is preferably a time period (e.g., 1 hour, 3 hours, morning, afternoon, etc.) shorter than the first predetermined period T1 described above. The second predetermined period T2 may be the same as the first predetermined period T1. When the second predetermined period T2 is shorter than the first predetermined period T1, the second upper limit number of times Nm2 may be set by dividing the first upper limit number of times Nm1 by the second predetermined period T2 by the first predetermined period T1 (Nm2=Nm1×H2/H1). When the second predetermined period T2 is the same as the first predetermined period T1, the second upper limit number of times Nm2 may be the same as the first upper limit number of times Nm (Nm2=Nm1).

The first time H1 may be a fixed value or may be a variable value. When the variable value is set, the first time H1 may be set to a longer time as the cumulative value of the number of times of execution Nc of ON/OFF control in the first predetermined period T1 is larger. As described above, it is possible to effectively prevent the number of times of execution Nc of ON/OFF control from reaching the first upper limit count N1 in a short period by pausing the power supply to the load device 40 until the first time H1 elapses when the number of times of execution Nc of ON/OFF control reaches the second upper limit count Nm2.

When the second pause condition is satisfied, the power supply pause control unit 140 pauses the power supply to the load device 40 immediately after the relay circuit is switched from ON to OFF until a predetermined second time H2 elapses. That is, until the second time H2 elapses, the relay circuit is maintained in OFF even if the generated electric energy W reaches the power supply starting threshold value WU. The second time H2 of the second pause condition may be the same as the first time H1 of the first pause condition. The second time H2 may be a fixed value or may be a variable value. When the variable value is set, for example, the second time H2 may be set to a longer time as the cumulative value of the number of times of execution Nc of ON/OFF control in the first predetermined period T1 is larger. In this way, when the relay circuit is switched from ON to OFF, the power supply to the load device 40 is stopped until the second time H2 elapses, so that it is possible to effectively prevent the number of times of execution Nc of ON/OFF control from reaching the first upper-limit count N1 in a short period of time.

Figure 5:
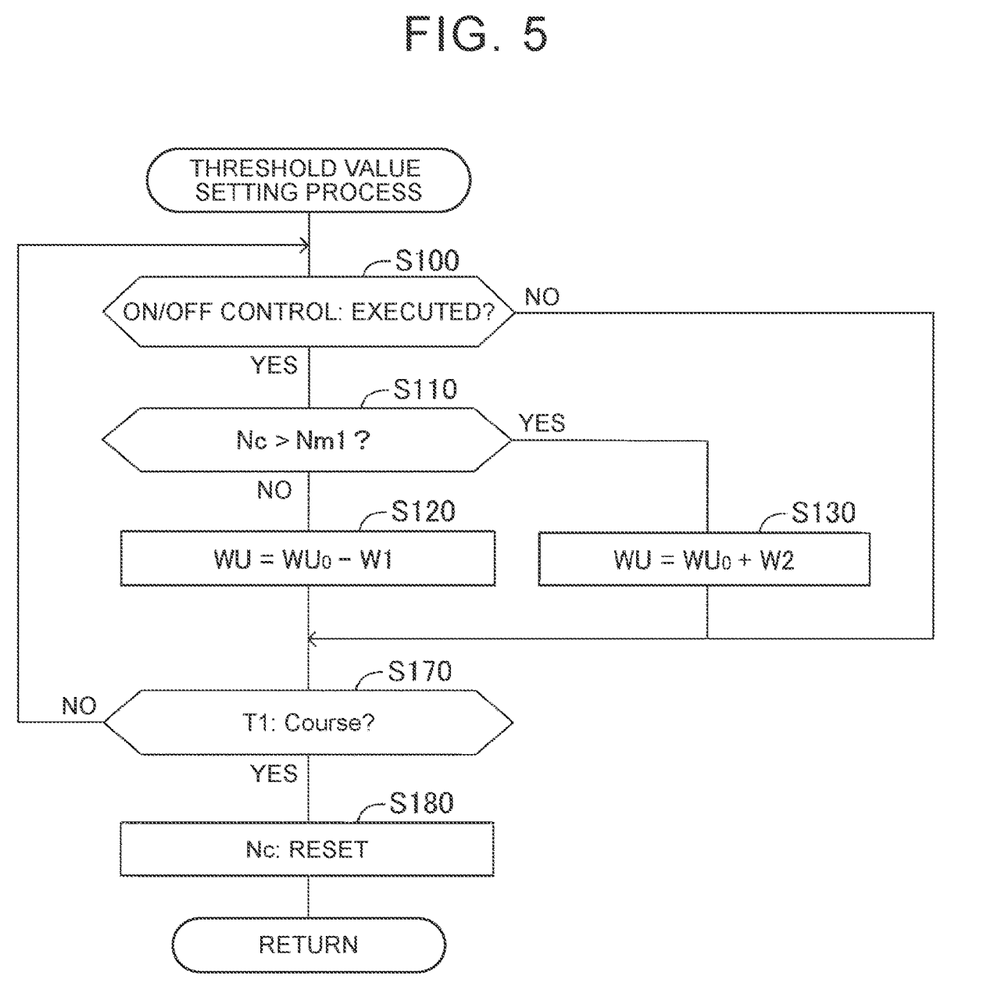
FIG. 5 is a flowchart illustrating a routine of threshold setting processing by the threshold value setting unit.

Next, a routine of threshold value setting processing by the threshold value setting unit 130 will be described based on the flowchart shown in FIG. 5.

In S100, the threshold value setting unit 130 determines whether or not ON/OFF control has been executed by ON/OFF control unit 110. When ON/OFF control is executed (Yes), the threshold value setting unit 130 proceeds to S110 determination process.

On the other hand, when ON/OFF control is not executed (No), the threshold value setting unit 130 proceeds to a S170 process to be described later.

In S110, the threshold value setting unit 130 determines whether or not the number of times of execution Nc of ON/OFF control counted by ON/OFF counting unit 120 in the first predetermined period T1 exceeds the first upper limit number of times Nm1. When the number of times of execution Nc does not exceed the first upper limit number of times Nm1 (No), the threshold value setting unit 130 proceeds to S120 process.

In S120, the threshold value setting unit 130 sets a value obtained by subtracting the first correction value W1 from the reference starting threshold value $WU_0$ to the power supply starting threshold value WU (=$WU_0$−W1). Next, in S170, the threshold value setting unit 130 determines whether or not the first predetermined period T1 has elapsed. When the first predetermined period T1 has not elapsed (No), the threshold value setting unit 130 returns to S100 process. On the other hand, when the first predetermined period T1 has elapsed (Yes), the threshold value setting unit 130 proceeds to S180 process, resets the count value of the number of times of execution Nc of ON/OFF control, and returns this routine.

When S110 determination is affirmative (Yes), that is, when the number of times of execution Nc of ON/OFF control exceeds the first upper limit number of times Nm1, the threshold value setting unit 130 proceeds to S130 process. In S130, the threshold value setting unit 130 sets a value obtained by adding the second correction value W2 to the reference starting threshold value $WU_0$ to the power supply starting threshold value WU (=$WU_0$+W2), and proceeds to S170 process.

Figure 6:
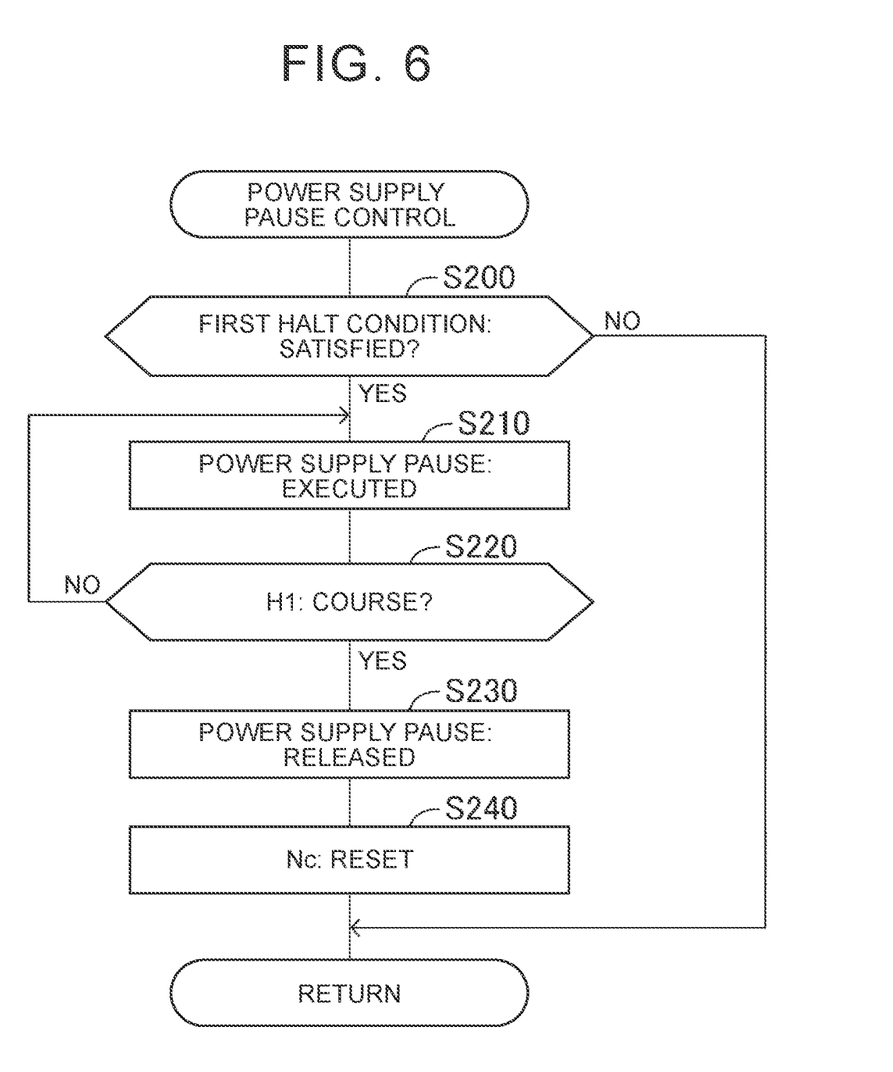
FIG. 6 is a flowchart for explaining a routine of power supply pause control based on the first pause condition by the power supply pause control unit.

Next, a routine of power supply pause control based on the first pause condition by the power supply pause control unit 140 will be described based on the flowchart shown in FIG. 6. This routine is executed in parallel with the routine shown in FIG. 5.

In S200, the power supply pause control unit 140 determines whether or not the first pause condition is satisfied. The first pause condition is satisfied when the number of times of execution Nc of ON/OFF control reaches a predetermined second upper limit number of times Nm2 within the second predetermined period T2. When the first pause condition is satisfied (Yes), the power supply pause control unit 140 proceeds to S210 process. On the other hand, when the first pause condition is not satisfied (No), the power supply pause control unit 140 returns this routine.

In S210, the power supply pause control unit 140 pauses the power supply to the load device 40. Next, in S220, the power supply pause control unit 140 determines whether or not the first time H1 has elapsed. When the first time H1 has not elapsed (No), the power supply pause control unit 140 returns to S210 process and maintains the power supply pause. On the other hand, when the first time H1 has elapsed (Yes), the power supply pause control unit 140 proceeds to S230 process and releases the power supply pause. Next, in S240, the power supply pause control unit 140 resets the counted value of the number of times of execution Nc of ON/OFF control within the second predetermined period T2, and returns this routine. Note that S230 and S240 processes are out of order and may be performed simultaneously.

Figure 7:
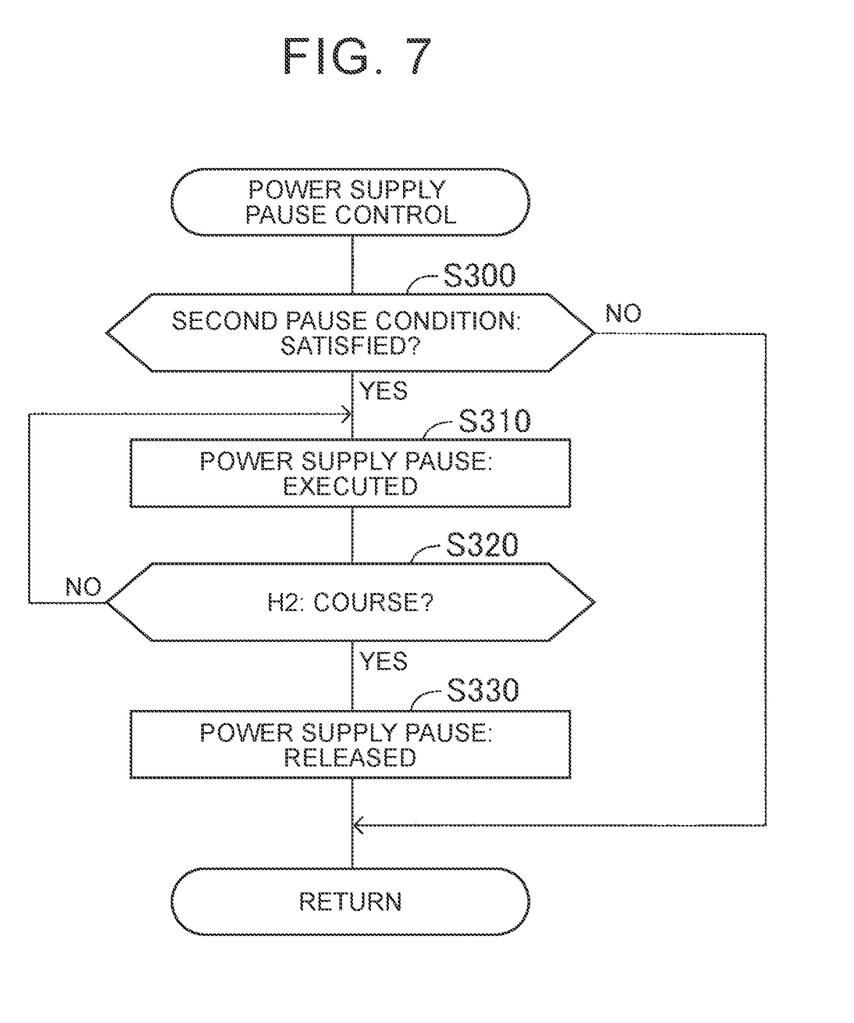
FIG. 7 is a flowchart for explaining a routine of power supply pause control based on the second pause condition by the power supply pause control unit.

Next, a routine of the power supply pause control based on the second pause condition by the power supply pause control unit 140 will be described based on the flowchart shown in FIG. 7. This routine is executed in parallel with the routines shown in FIG. 5 and FIG. 6.

In S300, the power supply pause control unit 140 determines whether or not the second pause condition is satisfied. The second pause condition is satisfied when ON/OFF control unit 110 switches the relay circuit from ON to OFF. When the second pause condition is satisfied (Yes), the power supply pause control unit 140 proceeds to S310 process. On the other hand, when the second pause condition is not satisfied (No), the power supply pause control unit 140 returns this routine.

In S310, the power supply pause control unit 140 pauses the power supply to the load device 40. Next, in S320, the power supply pause control unit 140 determines whether or not the second time H2 has elapsed. When the second time H2 has not elapsed (No), the power supply pause control unit 140 returns to S310 process and maintains the power supply pause. On the other hand, when the second time H2 has elapsed (Yes), the power supply pause control unit 140 proceeds to S330 process, releases the power supply pause, and then returns this routine.

Although the solar power generation system, the control method, and the program according to the present embodiment have been described above, the present disclosure is not limited to the above embodiment, and various modifications can be made without departing from the object of the present disclosure.

Modified Example

For example, in the above-described embodiment, the threshold value setting unit 130 has been described as increasing or decreasing the power supply starting threshold value WU based on whether or not the number of times of execution Nc of ON/OFF control has reached the first upper limit number of times Nm1, but may be configured to increase or decrease the power supply starting threshold value WU based on the fluctuation tendency (history) of the past sunshine. Hereinafter, the threshold setting process of the modification will be described in detail.

The threshold value setting unit 130 obtains an execution history of ON/OFF control for each time zone (for example, every hour), that is, an execution frequency for each time zone, based on the number of times of execution Nc of ON/OFF control stored in association with the date and time information by ON/OFF counting unit 120 in a predetermined period of time (for example, the latest days, weeks, months, or the like). In a time zone in which the execution frequency of ON/OFF control is low, the amount of sunlight is stable, and in a time zone in which the execution frequency of ON/OFF control is high, it can be estimated that the amount of sunlight is unstable.

The threshold value setting unit 130 reduces the power supply starting threshold value WU more than the reference starting threshold value $WU_0$ in a time period in which ON/OFF control is performed less frequently, that is, in a time period in which the amount of sunlight is estimated to be stable. This makes it easier for the relay circuit to be continuously maintained in ON during a period in which the amount of sunlight is estimated to be stable, and thus the power supply to the load device 40 can be improved. The amount of reduction that reduces the power supply starting threshold value WU may be a fixed value or a variable value. When the variable value is set, the reduction amount may be set to be larger as the execution frequency (history) of ON/OFF control is lower.

On the other hand, the threshold value setting unit 130 increases the power supply starting threshold value WU more than the reference starting threshold value $WU_0$ in a time period in which ON/OFF control is frequently executed, that is, in a time period in which the amount of sunlight is estimated to be unstable. As a result, the frequency of executing ON/OFF control can be suppressed, and the lifetime of the entire device can be effectively prevented from being deteriorated. The increment for increasing the power supply starting threshold value WU may be a fixed value or a variable value. When the variable value is set, the increment may be set larger as the frequency (history) of executing ON/OFF control is higher.

Further, the threshold value setting unit 130 acquires, from the past execution history of ON/OFF control, a time period in which the relay circuit is switched from OFF to ON in a relatively short time, that is, a time period in which it is estimated that the relay-circuit has recovered in a relatively short time after the amount of sunlight has decreased, and decreases the power supply stopping threshold value WB for a predetermined time in the time period. That is, even if the generated electric energy W of the solar panel 10 is temporarily lower than the power consumption amount of the load device 40, the power supply stopping threshold value WB are reduced in a period in which the amount of sunlight is predicted to recover at a relatively early stage, thereby making it easier to keep the relay circuit in ON. This makes it possible to effectively improve the power supply efficiency. In addition, since the power supply is continued, the frequency of executing ON/OFF control can be reduced, and the lifetime of the entire system can be suppressed.

The threshold value setting unit 130 may increase or decrease the power supply starting threshold value WU by using not only the execution history of ON/OFF control of the vehicle V (host vehicle) but also the execution history (so-called big data) of ON/OFF control of the plurality of vehicles (other vehicles). In this way, it is possible to further improve the accuracy of the threshold setting. Further, the threshold value setting unit 130 may acquire information on the sunshine of the area where the vehicle V is located from the weather center by communication, and increase or decrease the power supply starting threshold value WU based on the weather information.

Further, the threshold setting process of the modified example can be executed in combination with the threshold setting process of the above-described embodiment. That is, the threshold value setting unit 130 may further increase or decrease the power supply starting threshold value WU based on the past execution history of ON/OFF control, while increasing or decreasing the power supply starting threshold value WU, based on whether or not the number of times of execution Nc of ON/OFF control has reached the first upper limit number of times Nm1. Further, the threshold setting process of the modification is not limited to the configuration of increasing or decreasing the power supply starting threshold value WU, and may be configured to increase or decrease the power supply stopping threshold value WB or both the power supply starting threshold value WU and the power supply stopping threshold value WB.

Further, the present disclosure can be widely applied to solar power generation systems other than vehicle-mounted systems.

What is claimed is:

1. A solar power generation system comprising:
    a solar power generation device;
    a load device to which power generated by the solar power generation device is supplied; and
    a control device that controls power supply of the power from the solar power generation device to the load device, wherein the control device includes
        a switching control unit that executes switching control for starting the power supply to the load device when electric energy generated by the solar power generation device becomes equal to or larger than a predetermined starting threshold value, and stopping the power supply to the load device when the electric energy becomes equal to or smaller than a predetermined stopping threshold value that is smaller than the starting threshold value,
        a number-of-times acquiring unit that acquires the number of times of execution of starting or stopping of the power supply by the switching control, and
        a threshold value setting unit that increases or reduces at least one of the starting threshold value and the stopping threshold value based on whether the number of times of execution acquired by the number-of-times acquiring unit within a first predetermined period has reached a predetermined first upper limit number of times determined as an upper limit number of times of execution of the switching control within the first predetermined period.

2. The solar power generation system according to claim 1, further comprising a power supply pause control unit that pauses the power supply to the load device until a predetermined time elapses from establishment of a condition when any one of a first pause condition and a second pause condition is satisfied, the first pause condition being a condition in which the number of times of execution acquired by the number-of-times acquiring unit within a second predetermined period reaches a predetermined second upper limit number of times determined as an upper limit number of times of execution of the switching control within the second predetermined period, and the second pause condition being a condition in which the switching control unit stops the power supply to the load device.

3. The solar power generation system according to claim 1, wherein the threshold value setting unit further increases or reduces, based on a change in an amount of sunlight for each predetermined time zone in the past, at least one of the starting threshold value and the stopping threshold value for each predetermined time zone.

4. The solar power generation system according to claim 3, wherein the threshold value setting unit estimates, based on a history of the number of times of execution for each predetermined time zone acquired by the number-of-times acquiring unit, the change in the amount of sunlight for each predetermined time zone.

5. A solar power generation system comprising:
    a solar power generation device;
    a load device to which power generated by the solar power generation device is supplied; and
    a control device that controls power supply of the power from the solar power generation device to the load device, wherein the control device includes
        a switching control unit that executes switching control for starting the power supply to the load device when electric energy generated by the solar power generation device becomes equal to or larger than a predetermined starting threshold value, and stopping the power supply to the load device when the electric energy becomes equal to or smaller than a predetermined stopping threshold value that is smaller than the starting threshold value,
        a threshold value setting unit that increases or reduces, based on a change in an amount of sunlight for each predetermined time zone in the past, at least one of the starting threshold value and the stopping threshold value for each predetermined time zone.

6. A control method of a solar power generation system that supplies power generated by a solar power generation device to a load device, the control method comprising:
    executing switching control for starting power supply to the load device when electric energy generated by the solar power generation device becomes equal to or larger than a predetermined starting threshold value, and stopping the power supply to the load device when the electric energy becomes equal to or smaller than a predetermined stopping threshold value that is smaller than the starting threshold value;
    acquiring the number of times of execution of starting or stopping of the power supply by the switching control; and
    increasing or reducing at least one of the starting threshold value and the stopping threshold value based on whether the number of times of execution acquired within a first predetermined period has reached a predetermined first upper limit number of times determined as an upper limit number of times of execution of the switching control within the first predetermined period.

* * * * *